J. G. ROSEBOOM.
DIRECTION SIGNAL.
APPLICATION FILED AUG. 7, 1920.
1,385,230.
Patented July 19, 1921.
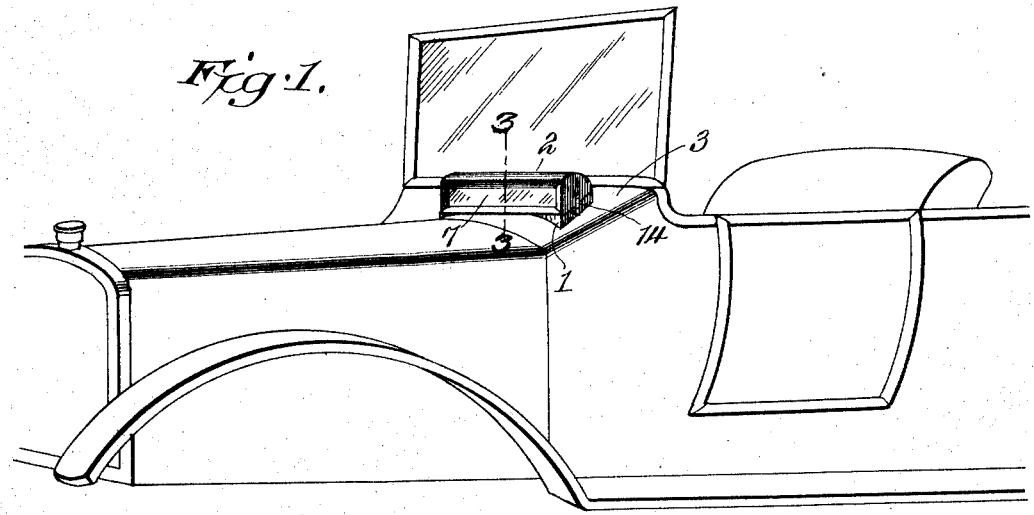
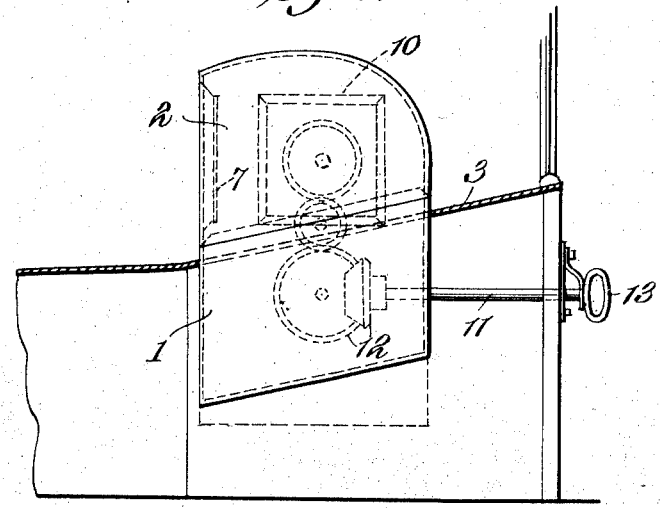
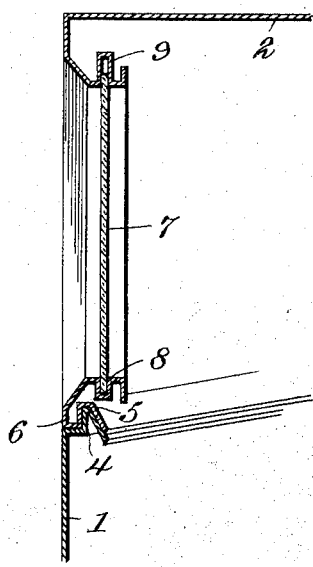
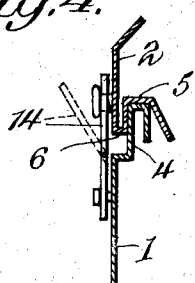
INVENTOR
J. G. Roseboom,
BY James J. Sheehy & Co.
ATTORNEYS

UNITED STATES PATENT OFFICE.

JESSE G. ROSEBOOM, OF CINCINNATI, OHIO.

DIRECTION-SIGNAL.

1,385,230.  Specification of Letters Patent.  Patented July 19, 1921.

Application filed August 7, 1920. Serial No. 401,945.

*To all whom it may concern:*

Be it known that I, JESSE G. ROSEBOOM, a citizen of the United States, residing at Cincinnati, in the county of Hamilton and State of Ohio, have invented new and useful Improvements in Direction-Signals, of which the following is a specification.

My present invention pertains to hoods for direction signals and it contemplates the provision of a hood for use in connection with direction signals now in use on vehicles and more particularly in connection with my improved direction signal, filed November 25, 1919, Serial Number 340,498, especially when employed on the cowl of an automobile.

The invention further contemplates the provision of a hood of the character set forth that will prevent water from gaining access to the signal itself and at the same time one that will add rather than detract from the finished and ornamental appearance of a vehicle.

The invention in all of its details will be fully appreciated from the following description and claims when the same are read in connection with the drawings accompanying and forming part of the specification, in which:—

Figure 1 is a perspective view showing a motor vehicle equipped with my novel hood.

Fig. 2 is a longitudinal section of the hood and the cowl of a vehicle.

Fig. 3 is an enlarged sectional view of the visual portion of the hood and its arrangement with respect to the hood taken on line 3—3 of Fig. 1.

Fig. 4 is an enlarged sectional view of the construction of the abutting walls of the two sections of the hood illustrating the means for holding same together.

Similar numerals of reference, designate corresponding parts in all the views of the drawings.

My novel hood comprises a lower section 1 and an upper section 2 and the lower section 1 is secured in any approved manner in the cowl 3 of the vehicle and is cut on a bias as illustrated and is further arranged so as to extend slightly above the cowl 3.

The section 1 is provided at its upper edge with the peculiarly constructed portion 4 to receive the correspondingly constructed portion 5 of the section 2. This arrangement is shown clearly in Fig. 4 and when the upper section 2 is superimposed on the lower section 1 so that the walls 4 and 5 seat within each other, it will be manifest that the possibility of water gaining access to the signal is inhibited. This arrangement also precludes any objectionable rattle that may arise were the edges 4 and 5 constructed otherwise.

On the portion 6 of the upper section I arrange a button to receive a trunk fastener 14 whereby the sections are held securely together. I might say that any form of fastener may be used for this purpose, as I make no specific claim for this feature of the device.

In the front wall of the section 2 I place a glass or other transparent substance 7. At the upper end of the opening that receives this glass 7, I provide a comparatively deep channel or groove 9 and at the bottom thereof, I provide a comparatively shallow channel 8 and hence in inserting the glass in the opening the said glass is forced upward in the channel 9 until the lower end of said glass will pass the wall 6 at the bottom of the opening when the glass will readily drop into channel 8.

Manifestly the direction signal indicating means 10 will register with the transparent means and naturally I make provision for an opening in the section 1 to receive the operating rod 11 to the gears or other mechanical operating means 12. I also make provision for securing the rod 11 to the section 1 whereby the rod may be easily operated by the handle 13.

It will be apparent from the foregoing that my invention is simple in construction and may be readily arranged with but slight alterations in the cowl of a vehicle and should necessity arise the sections may be quickly removed from each other to permit access to the gears of a signal.

Having described my invention, what I claim and desire to secure by Letters-Patent is:—

1. In a hood for direction signals the combination of a lower section arranged in the upper wall of the cowl of a vehicle, a section superimposed on the first section, interlocking walls at the meeting line of the two sections to prevent passage of water to the casing formed by the sections, a transparent panel mounted in the front wall of the upper section, and signal means within the casing visible through transparent plate.

2. In means for the purpose specified, the combination with the cowl of a motor vehicle of a casing formed of two sections, the lower of which has its upper wall cut on a bias and extends above the cowl, a channel formed in the upper portion of the wall and the upper of the sections having a channel formed in its lower wall to be received by and to receive the upper wall of the lower section to form a water-tight connection between the sections, means for securely fastening the sections together, and means in the upper section to receive a transparent plate; said section having a comparatively deep channel at its upper edge adjacent the opening and a comparatively shallow channel in its lower edge adjacent the opening where the transparent material may be quickly and securely arranged in the opening.

3. In a signal casing, the combination with the cowl of a vehicle of superimposed sections removably secured to each other and constructed and arranged at their abutting edges to present a water tight connection, and a transparent plate arranged in one of the sections; said section being so constructed as to permit ready removal and insertion of the visual means therein.

4. In a casing the combination of a lower section, a channel formed in the upper edge of the section, a section adapted to be superimposed on the first-named section, and a transparent plate arranged in the second section, and a channel formed in the lower edge of said section; the channels of the lower and upper sections being adapted to receive and be received by the channels of the opposing section whereby water will be precluded from gaining access to the inside of the casing formed by the sections.

In testimony whereof I have hereunto set my hand in presence of two subscribing witnesses.

JESSE G. ROSEBOOM.

Witnesses:
  Mrs. J. BOCKHOLDT,
  CARLOS MAGIO.